United States Patent
Lewandowski

(10) Patent No.: US 11,722,334 B2
(45) Date of Patent: Aug. 8, 2023

(54) NETWORK COMMUNICATION SYSTEM WITH BIDIRECTIONAL CURRENT MODULATION FOR TRANSMITTING DATA

(71) Applicant: Valeo Schalter und Sensoren GmbH, Bietigheim-Bissingen (DE)

(72) Inventor: Marek Lewandowski, Bietigheim-Bissingen (DE)

( * ) Notice: Subject to any disclaimer, the term of this patent is extended or adjusted under 35 U.S.C. 154(b) by 121 days.

(21) Appl. No.: 17/312,738

(22) PCT Filed: Nov. 18, 2019

(86) PCT No.: PCT/EP2019/081575
§ 371 (c)(1),
(2) Date: Jun. 10, 2021

(87) PCT Pub. No.: WO2020/120071
PCT Pub. Date: Jun. 18, 2020

(65) Prior Publication Data
US 2022/0052873 A1    Feb. 17, 2022

(30) Foreign Application Priority Data
Dec. 13, 2018    (DE) .................. 10 2018 132 024.8

(51) Int. Cl.
*H04L 12/40*    (2006.01)
*H04L 25/02*    (2006.01)

(52) U.S. Cl.
CPC .... *H04L 12/40039* (2013.01); *H04L 25/0266* (2013.01); *H04L 2012/40273* (2013.01)

(58) Field of Classification Search
CPC ........... H04L 12/40039; H04L 25/0266; H04L 2012/40273; H04L 12/40
See application file for complete search history.

(56) References Cited

U.S. PATENT DOCUMENTS 9,325,245 B2    4/2016  Lin
9,496,969 B1   11/2016  Casters
(Continued)

FOREIGN PATENT DOCUMENTS

DE   19900869 A1   7/2000
DE   10306444 A1   9/2004
(Continued)

OTHER PUBLICATIONS

International Search Report and Written Opinion in corresponding International Application No. PCT/EP2019/081575, dated Feb. 17, 2020 (12 pages).

(Continued)

*Primary Examiner* — Justin T Van Roie
(74) *Attorney, Agent, or Firm* — Osha Bergman Watanabe & Burton LLP

(57) ABSTRACT

A network communication system for a vehicle includes a communication bus, a first communication device, and a plurality of second communication devices which are connected to one another via the communication bus. The first communication device includes a bias voltage source for generating a constant bias voltage on the communication bus, the first communication device includes a current measurement apparatus for capturing the current on the communication bus, the network communication system includes a terminating resistor which is arranged in parallel with the plurality of second communication devices, the first communication device includes a first modulation apparatus for modulating a current set by the bias voltage and the terminating resistor on the communication bus, each second communication device includes a second voltage measurement apparatus for capturing a voltage at the terminating resistor and a second modulation apparatus for modulating (Continued)

Figure 1:
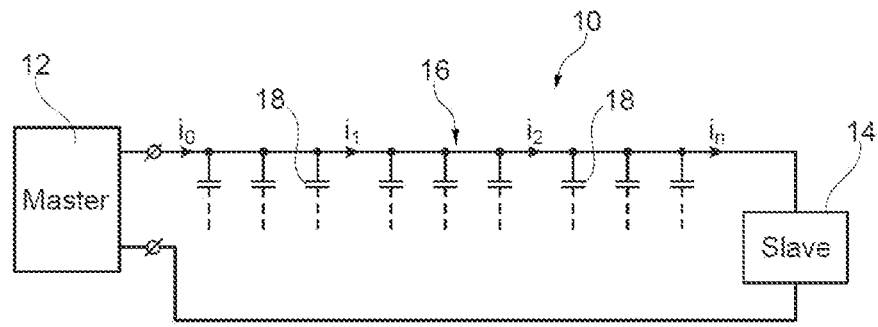

the current set by the bias voltage and the terminating resistor.

13 Claims, 2 Drawing Sheets

(56) References Cited

U.S. PATENT DOCUMENTS

| | | | |
|---|---|---|---|
| 11,030,137 B2* | 6/2021 | Teutenberg | G06F 13/4022 |
| 2008/0217076 A1* | 9/2008 | Kraemer | H04L 5/1423 |
| | | | 178/63 B |
| 2009/0243655 A1 | 10/2009 | Nascimento et al. | |
| 2017/0050588 A1 | 2/2017 | Hammerschmidt | |
| 2019/0356507 A1* | 11/2019 | Yousef | H03M 5/12 |

FOREIGN PATENT DOCUMENTS

| | | |
|---|---|---|
| DE | 102012110732 B3 | 6/2013 |
| DE | 102014015308 A1 | 4/2016 |
| DE | 102016118004 A1 | 3/2018 |
| EP | 1371045 B1 | 9/2013 |
| EP | 2765713 A1 | 8/2014 |
| EP | 3116169 A1 | 1/2017 |
| JP | H08-065196 A | 3/1996 |
| JP | 2000-307615 A | 11/2000 |
| JP | 2007-501549 A | 1/2007 |
| WO | 03/053018 A1 | 6/2003 |

OTHER PUBLICATIONS

German Search Report issued in corresponding German Application No. 10 2018 132 024.8, dated Sep. 18, 2019 (5 pages).
Notification of Reason for Rejection issued in Japanese Patent Application No. 2021-533669, dated Sep. 20, 2022 (6 pages).

* cited by examiner

NETWORK COMMUNICATION SYSTEM WITH BIDIRECTIONAL CURRENT MODULATION FOR TRANSMITTING DATA

The present invention relates to a network communication system, in particular for a vehicle, having a communication bus, a first communication device and a plurality of second communication devices which are connected to one another via the communication bus.

The present invention also relates to a method for communicating in a network communication system, in particular for a vehicle, having a communication bus, a first communication device and a plurality of second communication devices which are connected to one another via the communication bus.

The prior art discloses various types of network communication systems. One type of network communication system is a so-called 1:N network communication system having a master network node, which is also simply referred to as a master, and a plurality of satellite network nodes which are also referred to as slaves below. The master can transmit information to the slaves and can receive information from the slaves. However, the slaves cannot communicate with one another. In the present case, the master corresponds to the first communication device, while the slave corresponds to the second communication device.

The information is transmitted from the master to the slaves and from each of the individual slaves to the master via a transmission medium which is an electrical connecting line or a communication bus. The information to be transmitted in one direction or another is modulated or coded into electrical signals on the connecting line. The master therefore modulates data which are received by one or more slaves, and the slaves decode the data. The slaves likewise modulate their data to be transmitted which are in turn received and decoded by the master.

As a result of the physical properties of the connecting lines used to transmit the information, electromagnetic radiation arises as soon as an electrical state of the connecting line begins to change. This is the case as soon as the electrical signals on the connecting line are no longer constant, but rather are modulated with data.

FIG. 1 illustrates, by way of example, such a network communication system 10. As described above, the network communication system 10 comprises a master 12 and a plurality of slaves 14, only one slave 14 of which is illustrated in FIG. 1 for reasons of simplicity. The master 12 and the slave 14 are electrically connected to one another via a communication bus 16. Stray capacitances 18, to which signal currents (alternating current) can flow away, arise along the communication bus 16, thus producing the electromagnetic radiation. Accordingly, a current from the master 12 to the slave 14 is reduced by that proportion of the current which flows away at each of the stray capacitances, with the result that, starting from an output current $i_0$ at the master 12, only an input current in is received at the slave 14. Reduced currents $i_1$ and $i_2$ in comparison with the output current $i_0$ at the master 12 likewise arise in FIG. 1 between different segments of the communication bus 16.

A stray current results as $I=C*dV/dt$, where "C" is the stray capacitance and "V" indicates a voltage on a corresponding section of the connecting line. Radiation of the connecting line R is proportional to $dI/dt=C*d^2V/dt^2$, where "dI/dt" is the first derivative of the stray current of the connecting line and "$d^2V/dt^2$" is the second derivative of the voltage of the connecting line. The radiation R is therefore proportional to the speed of the change in the bus current or proportional to the second derivative of the bus voltage.

In order to meet the high requirements in the field of automotive EMC (electromagnetic compatibility) standards and the high requirements from individual OEM manufacturers, the radiation must be below certain limit values which are defined in different frequency ranges. In order to comply with the standards, the data modulation is usually adapted using the connecting line between the master and the slaves.

An implementation of an accurate adaptation according to the first derivative of the current is relatively easily possible in order to limit the radiation. This adaptation can therefore be easily carried out in network communication systems in which data are modulated using current ("current shaping"). However, on the basis of special features of conventional electronic circuits in 1:N network communication systems having one master and N slaves, the current modulation is used only in one direction, namely in the direction from the respective slave to the master.

Data are usually transmitted in the direction from the master to the slaves by means of coding with voltage modulation, wherein the optimum shaping of the voltage on the basis of an adaptation according to the second derivative of the voltage is substantially more complex than the adaptation according to the first derivative of the current. In addition, the equations cited above apply only to linear electronic circuits. If the communication bus also has nonlinear impedances, for example the bus is not only used for communication, an accurate adaptation according to the second derivative of the bus voltage is made very difficult, if actually possible. In practice, such exact adaptation of the modulation of the bus voltage is therefore not carried out, and instead the transmission of data is usually slowed down. Therefore, an achievable data transmission rate from the master to the slaves is often a multiple lower than the data transmission rate from the respective slave to the master.

Figure 2:
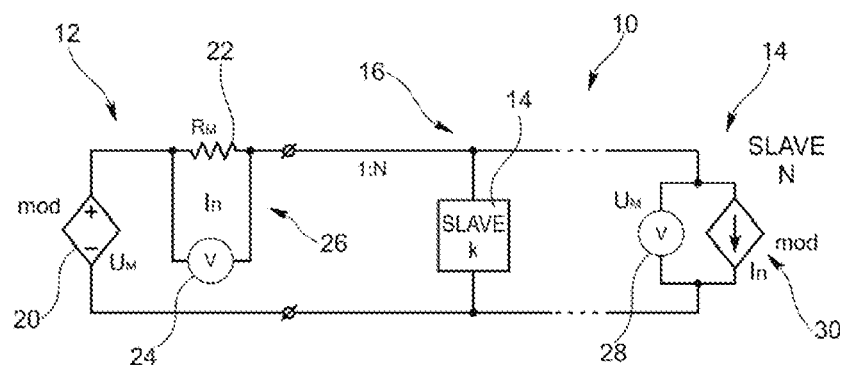

Such a network communication system 10 is illustrated in detail in FIG. 2. As previously explained with reference to FIG. 1, a master 12 is connected here to a plurality of slaves 14 via a communication bus 16.

The first communication device 12 comprises a voltage source 20 which can be modulated and is used to modulate the data to be transmitted by the first communication device 12 into voltage and to pass said data to the communication bus 16. The modulated voltage can then be captured in all slaves 14 connected to the communication bus 16 using a voltage measurement apparatus 28. The data transmitted by the master 12 can therefore be respectively decoded in each slave 14.

Each of the respective slaves 14 also comprises a current sink 30 which can be modulated and is used to modulate the data to be transmitted by the slave 14 into current which is drawn by the voltage source 20 present in the master 12 using a current measurement apparatus 26 via the communication bus 16. The modulated current is captured using the current measurement apparatus 26. The data transmitted by the respective slave 14 can therefore be decoded in the master 12. Communication networks 10 set up in this manner may be implemented in a very cost-effective manner.

In this context, WO 03/053018 A1 discloses a method for bidirectionally transmitting, on a communication path, data in the form of signals between at least two communication participants which each have at least one switchable load unit, at least one switchable current source unit assigned to the load unit and at least one comparator unit assigned to the load unit and, when transmitting the data, are at least temporarily assigned the function of a transmitter or are at least temporarily assigned the function of a receiver in that the load unit of the transmitter is disconnected before transmitting the signals, the current source unit of the transmitter is clocked accordingly in order to generate the signals to be transmitted via the communication path, the signals generated in this manner are transmitted via the communication path, with the result that corresponding output signals are produced at the comparator unit assigned to the receiver, and the load unit of the transmitter is switched on again after transmission.

EP 1 371 045 B1 discloses an apparatus for transmitting data between vehicle sensors and a control unit, wherein the data are transmitted from a respective vehicle sensor to the control unit asynchronously using a first data telegram. The control unit has an interface module which decodes the first data telegram with sensor data from the respective vehicle sensor and reformats it into a second data telegram. The interface module synchronously transmits the second data telegram to the processor of the control unit, wherein the interface module has a memory for buffering the sensor data. The second data telegram has an age bit for selecting the sensor data from the respective vehicle sensor, wherein the memory has a first data field for old sensor data and a second data field for new sensor data for each vehicle sensor, and the processor sets the age bit.

U.S. Pat. No. 9,325,245 B2 relates to a bidirectionally isolated DC/DC converter comprising two connections, two voltage-isolated and current-isolated capture units, a processing module, two filter circuit units and a bidirectional current conversion module. One of the two ports is selectively used as an input connection of the bidirectionally isolated DC/DC converter, and another of the two ports is used as an output connection. The two voltage-isolated and current-isolated capture units are each connected to the two connections in order to sample voltages and currents at the two connections and to generate corresponding feedback signals. The processing module receives the feedback signals and outputs corresponding control signals according to the feedback signals. The bidirectional power-converting module is connected to the two connections via the two voltage-isolated and current-isolated capture units in order to carry out the conversion of different voltages between the two connections according to the control signals which are output by the processing module.

U.S. Pat. No. 9,496,969 B1 discloses a pulse wave shaper for reducing the radiation emission level. The pulse wave shaper comprises a first integrator, wherein the first integrator receives a first pulse wave and generates a second pulse wave, and a second integrator is coupled to the first integrator, wherein the second integrator receives the second pulse wave and generates a third pulse wave with a pulse wave amplitude. The first pulse wave comprises a first pulse wave shape, the second pulse wave comprises a second pulse wave shape and the third pulse wave comprises a third pulse wave shape. The third pulse wave shape generates a reduced radiation emission level when transmitted via a bus.

Proceeding from the prior art cited above, the invention is therefore based on the object of specifying a network communication system and a method of the type mentioned above which enable fast and efficient communication in the transmission direction both from the master to the slaves and from each of the slaves to the master.

The object is achieved, according to the invention, by the features of the independent claims. Advantageous configurations of the invention are specified in the subclaims.

The invention therefore specifies a network communication system, in particular for a vehicle, having a communication bus, a first communication device and a plurality of second communication devices which are connected to one another via the communication bus, wherein the first communication device comprises a bias voltage source for generating a constant bias voltage on the communication bus, the first communication device comprises a current measurement apparatus for capturing the current on the communication bus, the network communication system has a terminating resistor which is arranged in parallel with the plurality of second communication devices, the first communication device comprises a first modulation apparatus for modulating a current set by the bias voltage and the terminating resistor on the communication bus, each second communication device comprises a second modulation apparatus for modulating the current set by the bias voltage and the terminating resistor, and each second communication device has a second voltage measurement apparatus for capturing a voltage at the terminating resistor.

The invention also specifies a method for bidirectional communication based on current modulation in a network communication system, in particular for a vehicle, having a communication bus, a first communication device, a plurality of second communication devices which are connected to one another via the communication bus, and a terminating resistor which is arranged in parallel with the plurality of second communication devices, comprising the steps of: generating a constant bias voltage on the communication bus using the first communication device, generating a modulated current on the communication bus using the first communication device, capturing the voltage caused by the current modulated using the first communication device at the terminating resistor using each of the second communication devices, generating a modulated current on the communication bus using one of the second communication devices, and capturing the current modulated using one of the second communication devices on the communication bus using the first communication device.

The basic idea of the present invention is therefore to bidirectionally use current modulation to modulate the data to be transmitted during communication between a first communication device, also called master below, and a plurality of second communication devices, also called slaves below. This has the advantage that the data transmission rate in the direction from the master to slaves, which can usually be achieved and is slower in the case of voltage modulation, can be increased in the case of current modulation. Current modulation makes it possible to directly adapt the current, thus being able to comply more easily with requirements imposed on the electromagnetic compatibility (EMC) of the network communication system. Since electromagnetic radiation is proportional to the first derivative of the current, that is to say to the change in the current, the modulation can be carried out in such a manner that the radiation can be reduced to a necessary or desired extent. Simple control of the radiation in turn makes it possible to improve and accelerate communication between the master and the slaves in comparison with communication based on voltage modulation. Restrictions of the data transmission rate in the case of voltage modulation, which are carried out in the prior art in order to limit the radiation during voltage modulation, are not required.

The communication bus is typically designed with two electrical lines, wherein one of the lines may be connected to earth. In this case, the first and second communication devices are connected in parallel with the two lines.

The constant bias voltage generated by the bias voltage source makes it possible to generate a constant quiescent current on the communication bus, on which data are modulated both by the first communication device and by each of the second communication devices. In this case, the modulation is carried out by the first or the respective second modulation device starting from the quiescent current. In this case, the second communication devices, in particular, can carry out their current modulation starting from the quiescent current, for example by means of a derivative of the current, with the result that they do not necessarily require their own current source.

In order to capture the modulation of the current carried out by the first communication device on the communication bus, the current on the communication bus is determined by the second communication devices using a change in the voltage dropped across the terminating resistor. Accordingly, the current modulation by the first communication device can be captured by the respective second communication device in order to decode the data modulated by the first communication device. A direct current measurement by the second communication devices would be difficult since the second communication devices are connected in parallel with the communication bus.

However, each second communication device can measure the voltage at the terminating resistor in a parallel manner, thus resulting in a current change. With knowledge of the terminating resistor, the current on the communication bus can be determined. In principle, it is not necessary to determine the exact values for the modulation of the current. Increased or reduced levels can code individual digital states, for example, without having to exactly determine the modulation current.

Data are transmitted from the first communication device to one of the second communication devices and from each of the second communication devices to the first communication device independently in each case and in basically any desired temporal sequence. It is only necessary to avoid the situation in which two of the communication devices want to transmit data at the same time.

In an advantageous configuration of the invention, the current measurement apparatus has a measurement resistor, through which the current modulated by the second communication device flows, and a first voltage measurement apparatus for capturing a voltage drop across the measurement resistor. The measurement resistor is, for example, in the form of a shunt having a small resistance value of one ohm or less. As a result of such a shunt, the current on the communication bus is influenced only slightly. The voltage measurement using the shunt can be carried out very easily and reliably.

In an alternative configuration of the invention, the current measurement apparatus may have a current mirror, through which the current modulated by the second communication device flows, and an ammeter. The ammeter can therefore measure, in particular, the current on the communication bus or the bus current, to be precise using the current mirror. As a result of the use of the current mirror, the current measurement does not have any effect on the rest of the circuit.

In an advantageous configuration of the invention, the bias voltage source and the first modulation apparatus are arranged in parallel in the first communication device, and a diode is connected upstream of the bias voltage source and blocks a current from the first modulation apparatus into the bias voltage source. The diode therefore prevents the modulated current from being smoothed or even completely absorbed by the bias voltage source. The quiescent current and the modulated current are added to form an overall current which includes the transmitted data in modulated form.

In an advantageous configuration of the invention, the bias voltage source and the current measurement apparatus are connected in series. The first communication device can therefore have a simple structure. The bias voltage source can provide the quiescent current on the communication bus in combination with a resistor, for example the terminating resistor. In this case, the current can flow through the voltage source and therefore also through the current measurement device.

In an advantageous configuration of the invention, the bias voltage source is in the form of a constant voltage source. The constant voltage source is therefore not used to modulate the data on the communication bus. The quiescent current can be set by selecting the constant voltage source in combination with the terminating resistor.

In an advantageous configuration of the invention, the first modulation device is connected in series with a first voltage source. The first voltage source presets the first modulation device. A circuitry adaptation is carried out in order to ensure the function of the first modulation device.

In an advantageous configuration of the invention, the first modulation apparatus and/or the second modulation apparatus is/are designed for analogue modulation of the quiescent current. The current modulation is therefore carried out in accordance with an analogue signal to be transmitted, with the result that the quiescent current is modulated on the basis thereof.

In an advantageous configuration of the invention, the first modulation apparatus and/or the second modulation apparatus is/are designed for digital modulation of the current, preferably with a plurality of different modulation current levels. In one implementation of the first communication device for example, the first modulation apparatus may be configured to drive a current during its data transmission at a dominant data level, that is to say to feed said current into the communication bus, and to block a current at a passive data level, that is to say the quiescent current is not changed. As a result, the modulated data appear on the communication bus above the quiescent current and therefore as a result of a voltage at the terminating resistor which is greater than the voltage of the constant voltage source. If a plurality of modulation current levels are used, it is possible to transmit accordingly more data in comparison with a binary data transmission.

In an advantageous configuration of the invention, the terminating resistor is arranged in the first communication device. There is no need to separately arrange the terminating resistor on the communication bus, thus simplifying the network communication system overall. The arrangement of the bus resistor in the first communication device makes it possible for all second communication devices to be able to have the same structure. This facilitates the structure and maintenance of the network communication system.

In an advantageous configuration of the invention, the terminating resistor is arranged in one of the second communication devices. There is no need to separately arrange the terminating resistor on the communication bus, thus simplifying the network communication system overall.

In an advantageous configuration of the invention, the terminating resistor is directly arranged on the communication bus. This makes it possible to provide the first and second communication devices without the need for a terminating resistor. All first and second communication devices can therefore each be produced in an identical manner.

The second modulation device is preferably in the form of a current sink. On the basis of the quiescent current on the communication bus preset by means of the first communication device, the modulation is accordingly carried out by reducing the quiescent current by means of the current sink. Accordingly, a lower portion of the quiescent current set by the first communication device flows through the terminating resistor, with the result that the voltage applied to the latter falls accordingly. The embodiment of the second communication devices each with a current sink is easily possible since there is no need to actively provide current. When current sinks are used, it is necessary for all current sinks to carry out blocking when they are not in use, that is to say while they themselves do not modulate any data onto the quiescent current on the communication bus, in order to prevent undesirable fluctuations of the current through the terminating resistor.

The invention is explained in more detail below with reference to the attached drawing and on the basis of preferred embodiments. The features illustrated can represent an aspect of the invention both individually in each case and in combination. Features of different exemplary embodiments can be transferred from one exemplary embodiment to another.

In the drawing

Figure 3A:
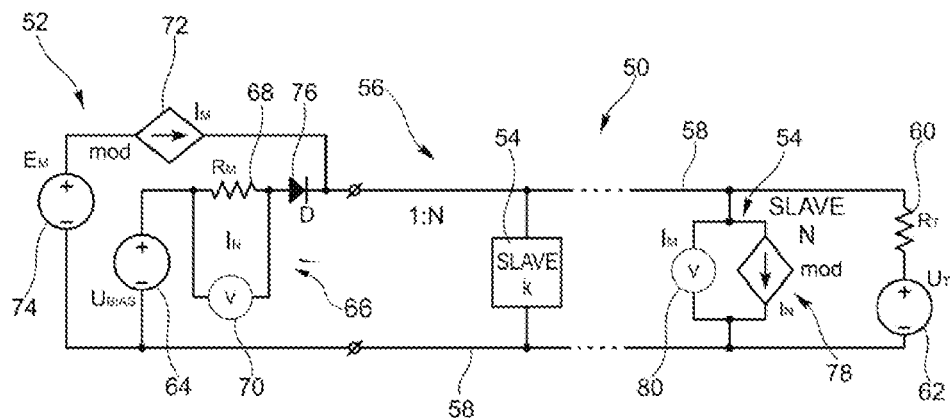
Figure 3B:
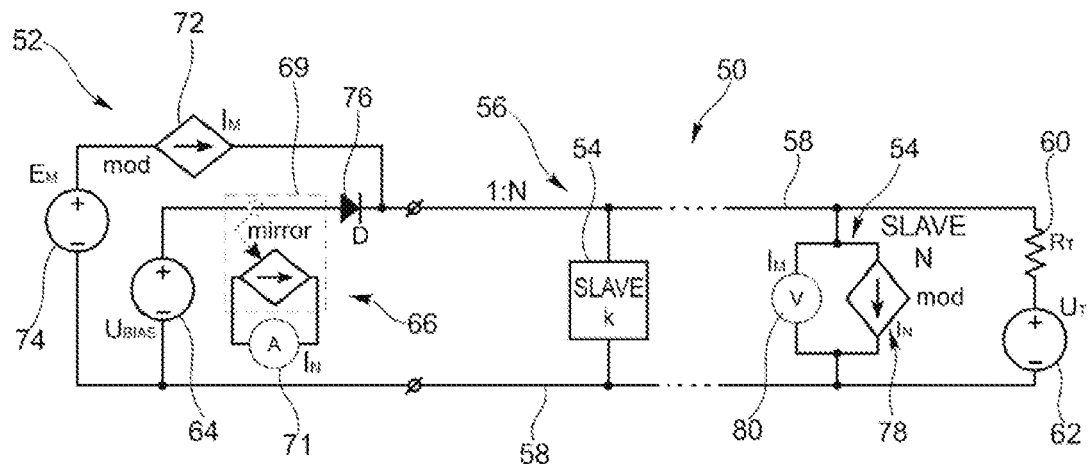
Figure 4:
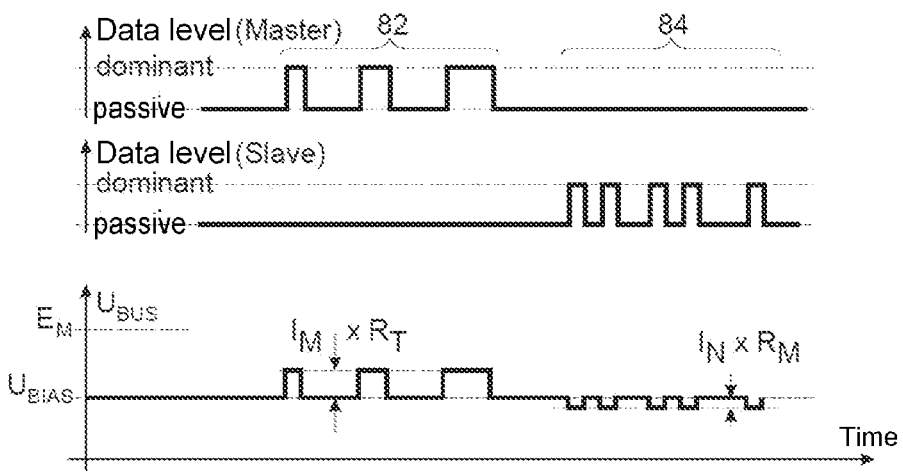
Figure 5:
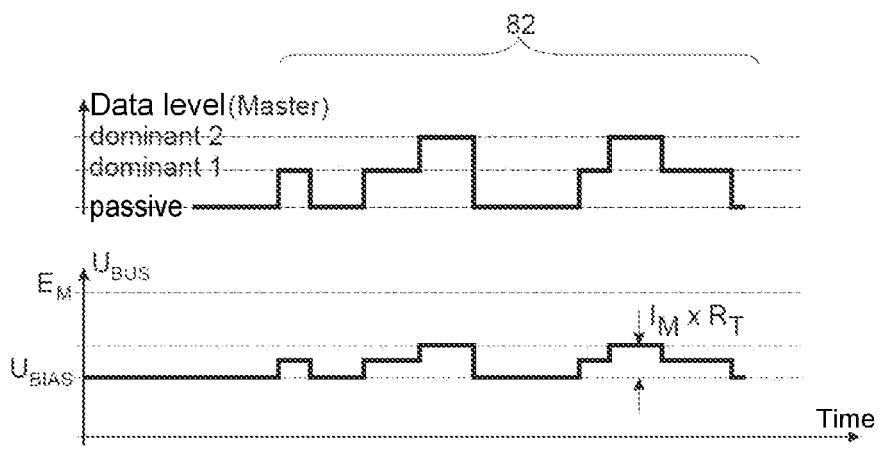

FIG. 1 shows a schematic view of a communication network from the prior art having a master and a slave which are connected to one another via a connecting line, wherein the connecting line has stray capacitances, FIG. 2 shows a specific configuration of the communication network from FIG. 1, wherein the master has a voltage source which can be modulated and each slave has a current sink which can be modulated, FIG. 3A shows a schematic illustration of a network communication system according to a first preferred embodiment having a first communication device, a plurality of second communication devices and a terminating resistor which are connected in parallel with a communication bus, FIG. 3B shows a schematic illustration of a network communication system according to a second, alternative embodiment having a current measurement apparatus based on a current mirror, FIG. 4 shows an exemplary time diagram having data transmission between the first communication device and a second communication device with a voltage profile at the terminating resistor when binary digital modulation is used, and FIG. 5 shows an exemplary time diagram having data transmission between the first communication device and a second communication device with a voltage profile at the terminating resistor when digital modulation having three different signal levels is used.

FIG. 3A shows a network communication system 50 according to a first preferred embodiment.

The network communication system 50 of the first embodiment comprises a first communication device 52, a plurality of second communication devices 54 and a communication bus 56 which is used to connect the first communication device 52 and the plurality of second communication devices 54 to one another. The communication bus 56 is embodied using two electrical lines 58.

The communication bus 56 also has a terminating resistor 60 which is connected to the communication bus 56 in parallel with the communication devices 52, 54. In an alternative embodiment, the terminating resistor 60 can be arranged in series with a constant terminating voltage source 62, with the result that the value of the terminating resistor 60 can be kept low.

The first communication device 52 comprises a bias voltage source 64 for generating a constant bias voltage on the communication bus 56. The constant bias voltage generates a quiescent current through the terminating resistor 60. The bias voltage source 64 is in the form of a constant voltage source 64 here.

Each of the second communication devices 54 comprises a second modulation apparatus 78 for modulating a sink current on the communication bus 56 and a second voltage measurement apparatus 80 for measuring a voltage at the terminating resistor 60. By measuring the voltage at the terminating resistor 60 using the second voltage measurement apparatus 80, each second communication device 54, with knowledge of the terminating resistor 60, can determine the overall current on the communication bus 56.

The first communication device 52 comprises a current measurement apparatus 66 which is connected in series with the bias voltage source 64. In this embodiment in FIG. 3A, the current measurement apparatus 66 comprises a measurement resistor 68, through which the quiescent current flows together with the current modulated by the current sink 78 of the respective second communication device 54. This current corresponds to a current on the communication bus 56. The first communication device 52 or the current measurement apparatus 66 also comprises a first voltage measurement apparatus 70 for measuring a voltage drop across the measurement resistor 68. With knowledge of the measurement resistance value 68, the value of the modulated current on the communication bus 56 can be determined.

In an alternative embodiment, the current measurement apparatus 66 can also be implemented using other means, without the measurement resistor 68 and the voltage measurement apparatus 70. For example, in a second, alternative embodiment, the current measurement apparatus 66 can be implemented using a current mirror 69 and an ammeter 71, as symbolically shown in FIG. 3B. The current measurement apparatus 66 therefore comprises a current mirror 69, through which the quiescent current flows together with the current modulated by the current sink 78 of the respective second communication device 54. This current also corresponds here to a current on the communication bus 56 or a bus current. The first communication device 52 or the current measurement apparatus 66 also comprises an ammeter 71 for measuring the current on the communication bus via the current mirror. As a result of the use of the current mirror, the current measurement does not have any effect on the rest of the circuit.

The following description relates both to the embodiment in FIG. 3A and to the embodiment in FIG. 3B. A first modulation apparatus 72 is arranged in series with a first supply voltage source 74 in parallel with the bias voltage source 64 and the current measurement apparatus 66. In the present case, the first modulation apparatus 72 is in the form of a current source which can be modulated. The first supply voltage source 74 makes it possible for the current source 72 which can be modulated to allow a modulated current to flow into the communication bus 56 in addition to the constant quiescent current.

In this context, a diode 76 is connected upstream in the series circuit comprising the bias voltage source 64 and the current measurement apparatus 66 and blocks a current from the first modulation apparatus 72 into the bias voltage source 64. The diode 76 therefore ensures that the current modulated by the first modulation apparatus 72 flows only into the communication bus 56 and is not smoothed or even completely absorbed by the bias voltage source 64. The quiescent current and the modulated current are added to form an overall current (bus current) which includes the transmitted data.

During operation, a constant quiescent current on the communication bus 56 from the first communication device 52 is first of all generated by the bias voltage source 64 in the network communication system 50. Both the first modulation apparatus 72 of the first communication device 52 and all second communication devices 54 are not active, that is to say no currents in addition to the quiescent current are generated or drawn on the communication bus 56. On the basis of this, data can be modulated using current modulation in a temporally offset manner both by the first communication device 52 and by each of the second communication devices 54, as explained in detail below.

If the first communication device 52 wishes to transmit data to one or more of the second communication devices 54, the first communication device 52 uses the first modulation apparatus 72 to modulate its data into modulated current and allows its modulated current to flow into the communication bus 56 in addition to the constant quiescent current. The second modulation apparatuses 78 of the second communication devices 54 remain inactive. As a result, the current flowing via the communication bus 56, that is to say the quiescent current together with the current modulated by the first modulation apparatus 72, flows completely through the terminating resistor 60. In comparison with the quiescent current, the current modulated by the first modulation apparatus 72 gives rise to an additional voltage drop across the terminating resistor 60. The second communication devices 54 measure the voltage at the terminating resistor 60 using their respective second voltage measurement apparatus 80 in order to therefore be able to decode the modulated data. Accordingly, the data modulated by the first communication device 52 can be decoded in each of the second communication devices 54.

Accordingly, the second communication devices 54 can each draw a modulated current from the communication bus 56 using the corresponding second modulation apparatus 78 in order to transmit data to the first communication device 52. This is made possible by the bias voltage and the resulting quiescent current, with the result that the second modulation apparatus 78 of each second communication device 54 can draw a modulated sink current which accordingly increases the quiescent current flowing from the bias voltage source 64.

The modulated sink current drawn by the respective second modulation apparatus 78 causes a change in the voltage drop across the measurement resistor 68, which change responds to the current modulated by one of the second communication devices 54. The first communication device 52 measures the voltage at the measurement resistor 68, as a result of which the data modulated by one of the second communication devices 54 can therefore be decoded.

Data are transmitted from the first communication device 52 to one of the second communication devices 54 and from each of the second communication devices 54 to the first communication device 52 independently in each case and in basically any desired temporal sequence. It is merely necessary to avoid the situation in which two of the communication devices 52, 54 want to transmit data at the same time.

FIG. 4 shows modulation of the current on the communication bus 56 by the first or one of the second communication devices 52, 54 in accordance with the first embodiment. During a first transmission phase 82, the first communication device 52 transmits data which are binary digital data having a dominant level and a passive level. Accordingly, the current on the communication bus 56 is increased by the first modulation apparatus 72 in order to modulate a dominant level. As a result, an instantaneous value of the voltage on the communication bus 56 is also increased, which can be captured and decoded using the second voltage measurement apparatus 80. In the case of a passive level, the current on the communication bus 56 remains unchanged; the first modulation apparatus 72 digitally codes the passive level with zero (0). In the case of an active level, the current on the communication bus 56 is accordingly changed; the first modulation apparatus 72 digitally codes the active level with one (1). The same applies to the modulation and transmission of data from one of the second communication devices 54 to the first communication device 52. While one of the second communication devices 54 modulates its data using its second modulation apparatus 78, the total current drawn by the bias voltage source 64 is increased. On account of the measurement resistor 68 connected in series, the instantaneous value of the voltage of the communication bus 56 is reduced.

FIG. 5 shows modulation of the current on the communication bus 56 by the first communication device 52 according to a second embodiment. The data to be modulated may here have three different levels, two dominant levels and a passive level. Accordingly, the current on the communication bus 56 is increased by the first modulation apparatus 72 in accordance with the first or second dominant level in order to modulate the data on the communication bus 56.

In a further embodiment, the data to be transmitted can be coded in both directions using a plurality of modulation levels and can be accordingly decoded after reception at the other end.

In an alternative embodiment, the terminating resistor 60 is arranged in the first communication device 52 or in the second communication device 54.

On the basis of the exclusive use of current modulation to transmit the data in the network communication system 50, the configuration of the modulated current can be adapted in order to meet the requirements imposed on electromagnetic compatibility (EMC). The actual adaptation of the modulation in order to reduce EMC emissions by the network communication system 50 is not within the scope of the invention and is therefore not explained at this point. In the present case, the network communication system 50 is provided in order to be able to carry out this adaptation of the modulation.

The invention claimed is:

1. A network communication system for a vehicle, the network communication system comprising:
   a communication bus;
   a first communication device;
   a plurality of second communication devices which are connected to one another via the communication bus; and
   a terminating resistor arranged in parallel with the plurality of second communication devices;
   wherein the first communication device comprises a bias voltage source for generating a constant bias voltage on the communication bus, and a current measurement apparatus for capturing the current on the communication bus;

wherein the first communication device comprises a first modulation apparatus for modulating a current set by the bias voltage and the terminating resistor on the communication bus;

wherein each second communication device comprises a second modulation apparatus for modulating the current set by the bias voltage and the terminating resistor;

wherein each second communication device has a second voltage measurement apparatus for capturing a voltage at the terminating resistor;

wherein the bias voltage source and the first modulation apparatus are arranged in parallel in the first communication device; and wherein a diode is connected upstream of the bias voltage source, the diode being configured to block a current from the first modulation apparatus into the bias voltage source.

2. The network communication system according to claim 1, wherein the current measurement apparatus has a measurement resistor, through which the current modulated by the second communication device flows, and a first voltage measurement apparatus for capturing a voltage drop across the measurement resistor.

3. The network communication system according to claim 1, wherein the current measurement apparatus has a current mirror, through which the current modulated by the second communication device flows, and an ammeter.

4. The network communication system according to claim 1, wherein the bias voltage source and the current measurement apparatus are connected in series.

5. The network communication system according to claim 1, wherein the bias voltage source is in a form of a constant voltage source.

6. The network communication system according to claim 1, wherein the first modulation apparatus is connected in series with a first supply voltage source.

7. The network communication system according to claim 1, wherein the first modulation apparatus or the second modulation apparatus is configured for analogue modulation of the current.

8. The network communication system according to claim 1, wherein the first modulation apparatus or the second modulation apparatus is configured for digital modulation of the current with a plurality of different modulation current levels.

9. The network communication system according to claim 1, wherein the terminating resistor is arranged in the first communication device.

10. The network communication system according to claim 1, wherein the terminating resistor is arranged in one of the second communication devices.

11. The network communication system according to claim 1, wherein the terminating resistor is directly arranged on the communication bus.

12. The network communication system according to claim 1, wherein the second modulation apparatus is in a form of a current sink which can be modulated.

13. A method for bidirectional communication based on current modulation in a network communication system for a vehicle, the network communication system having a communication bus, a first communication device, a plurality of second communication devices which are connected to one another via the communication bus, and a terminating resistor arranged in parallel with the plurality of second communication devices, the method comprising:

arranging a bias voltage source and a first modulation apparatus in parallel in the first communication device; and blocking a current from the first modulation apparatus into the bias voltage source with a diode connected upstream of the bias voltage source;

generating a constant bias voltage on the communication bus using the first communication device;

generating a modulated current on the communication bus using the first communication device;

capturing the voltage caused by the current modulated using the first communication device at the terminating resistor using each of the second communication devices;

generating a modulated current on the communication bus using one of the second communication devices; and capturing the current modulated using one of the second communication devices on the communication bus using the first communication device.

* * * * *